United States Patent
Sprinzl

(10) Patent No.: US 9,555,829 B2
(45) Date of Patent: Jan. 31, 2017

(54) METHOD FOR OPERATING A POWER STEERING MECHANISM

(71) Applicant: ZF Lenksysteme GmbH, Schwaebisch Gmuend (DE)

(72) Inventor: Michael Sprinzl, Suessen (DE)

(73) Assignee: Robert Bosch Automotive Steering GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/890,641

(22) Filed: May 9, 2013

(65) Prior Publication Data

US 2013/0245893 A1    Sep. 19, 2013

Related U.S. Application Data

(63) Continuation of application No. PCT/EP2011/070087, filed on Nov. 15, 2011.

(30) Foreign Application Priority Data

Nov. 15, 2010    (DE) .................. 10 2010 043 915

(51) Int. Cl.
    *B62D 5/04*    (2006.01)
    *B62D 6/00*    (2006.01)

(52) U.S. Cl.
    CPC .......... *B62D 5/0463* (2013.01); *B62D 5/0481* (2013.01); *B62D 5/0493* (2013.01); *B62D 6/008* (2013.01)

(58) Field of Classification Search
    CPC ... B62D 5/0463; B62D 5/0481; B62D 5/0493; B62D 6/008
    USPC .......................... 701/41, 42, 43, 44
    See application file for complete search history.

(56) References Cited

U.S. PATENT DOCUMENTS

| | | | |
|---|---|---|---|
| 6,134,491 A * | 10/2000 | Kawagoe et al. .............. 701/43 |
| 6,282,472 B1 * | 8/2001 | Jones .................. B62D 5/0463 |
| | | | 180/443 |
| 6,445,151 B1 * | 9/2002 | Nakano et al. ................. 701/42 |
| 7,069,129 B2 | 6/2006 | Iwazaki et al. |
| 7,510,038 B2 * | 3/2009 | Kaufmann et al. ............ 701/41 |
| 2005/0267661 A1 | 12/2005 | Iwazaki et al. |
| 2006/0047390 A1 * | 3/2006 | Scherl et al. ................... 701/41 |
| 2007/0203617 A1 * | 8/2007 | Haug .............................. 701/41 |
| 2009/0024278 A1 * | 1/2009 | Kondo et al. ................... 701/41 |
| 2009/0198427 A1 * | 8/2009 | Christopher Jackson et al. .............................. 701/70 |
| 2009/0271071 A1 * | 10/2009 | Buerkel et al. ................. 701/41 |
| 2010/0023205 A1 * | 1/2010 | Schmitt .......................... 701/34 |
| 2010/0211264 A1 * | 8/2010 | Wey et al. ...................... 701/41 |
| 2011/0276230 A1 | 11/2011 | Heilig et al. |

(Continued)

FOREIGN PATENT DOCUMENTS

| | | |
|---|---|---|
| DE | 10 2007 034 142 | 1/2009 |
| DE | 10 2009 000 165 | 7/2010 |

(Continued)

*Primary Examiner* — Nga X Nguyen
*Assistant Examiner* — Donald J Wallace
(74) *Attorney, Agent, or Firm* — Jordan and Koda, PLLC

(57) ABSTRACT

Provided is a method for operating a power steering system and to such a power steering system. A motor torque is computed by an electronic processor and is established by suitable motor actuation, wherein a plausibility check of the computed motor torque is carried out, taking a measured manual torque into consideration. A value of the additional torques of at least one special function is further considered in the plausibility check.

6 Claims, 4 Drawing Sheets

(56) References Cited

U.S. PATENT DOCUMENTS

2012/0035750 A1\* 2/2012 Edel ............................... 700/79
2012/0239255 A1\* 9/2012 Kojima et al. .................. 701/42
2013/0211676 A1\* 8/2013 Benyo et al. .................... 701/42

FOREIGN PATENT DOCUMENTS

DE     10 2009 005 836     7/2010
EP     1 602 552     12/2005
WO     WO 2010/127996 A1 \* 11/2010 ............... G05B 9/02

\* cited by examiner

METHOD FOR OPERATING A POWER STEERING MECHANISM

This is a continuation of PCT/EP2011/070087 filed Nov. 15, 2011.

BACKGROUND OF THE INVENTION

The invention relates to a method for operating a power steering system, to such a power steering system, to a control unit, and to a computer program and a computer program product for carrying out the method.

Power steering systems, which are also referred to as power-assisted steering systems, are used to achieve a reduction in the force that the driver must apply for steering. When using electric power steering (EPS) as the power-assisted steering system, a motor torque is computed depending on various input variables, the motor torque being superimposed, as added torque, on the manual torque that is applied by the driver.

So as to limit potential impact from faults in EPS systems, additional measures are known, which hereafter are referred to as safety measures. To this end, monitoring of the combination of manual and torque motor torque can be used to prevent safety-relevant operating situations by providing for a limitation to allowed combinations in the function path.

The published prior art DE 10 2009 000 165 A1 describes a method for operating a power steering system, in which a motor torque is computed by an electronic processor and established by suitable motor actuation. A plausibility check of the computed motor torque is carried out within the framework of the safety design, which is represented by a three-level design, for example. Contributions above the motor torque limit curve are integrated, and an integrator is decremented by contributions below the motor torque limit curve. The target motor torque is limited in level 1 to a first integration threshold. The limitation is monitored in level 2. Additionally, an intrinsically safe motor torque limit curve is used, as a function of an actual torque.

Over the past few years, special functions have been further developed, which utilize the EPS system by way of torque superposition, so as to achieve added value in terms of driver assistance. Examples include a parking steering assist function or a lane-tracking assist function (lane departure warning and lane maintenance support). As the degree of assistance rises, increasingly greater superimposed steering torques are required. These functions alter the manual torque depending on particular situations. Consequently, the combination of manual torque and motor torque is also altered, which has not been taken into account in the existing design.

SUMMARY OF THE INVENTION

The method that is described is used to operate a power steering system, wherein a motor torque is computed by an electronic processor and established by suitable motor actuation, wherein a plausibility check of the computed motor torque is carried out, taking a measured manual torque into consideration. In addition, a value of the added torques of at least one special function is considered.

In the method, the measured manual torque can be corrected by the typically appropriately signed value of the customarily additive added torques of the special function.

In one embodiment of the described method, the measured manual torque is increased. As an alternative, the manual torque is reduced.

In one embodiment of the described method, the plausibility check is carried out within the scope of a 3-level design, for example.

In a particular embodiment, the manual torque, which is customarily detected by way of a manual torque sensor, is controlled by specifying a target manual torque.

In addition, a power steering system for a motor vehicle is described, which is particularly suitable for carrying out a method of the type described above. This power steering system comprises an electronic processor for computing a motor torque, an electric motor for introducing a customarily specified added torque or motor torque, and a device for detecting a current manual torque. Customarily, a manual torque sensor, for example a torsion bar torque sensor, is used for this purpose. The power steering system is characterized in that a plausibility check of the computed motor torque is carried out, taking the measured manual torque into consideration, and that a value of the added torques of at least one special function is further considered in the plausibility check.

Moreover, a control unit is described, which is notably provided for use in a power steering system of the type described. This control unit comprises an electronic processor, which is used to compute a motor torque that is subjected to a plausibility check. A value of the added torques of a special function is further considered.

In the described method, a basic distinction can be made, concerning the behavior of the safety function, between cases in which the special function increases the manual torque and cases in which the special functions reduce the manual torque.

An increase of the manual torque means a reduction in the assistive power, which is to say the EPS motor must contribute less torque to the system. The motor torque thus always remains within the limits, since a reduction of the assistive power constitutes the transition to a safe state (no assistance) from a safety perspective. Thus, no functional limitation lakes place.

However, increasing the manual torque while affecting the special function allows a considerably higher EPS motor torque, even though this is not functionally necessary and should definitely be avoided from a safety perspective, because in this situation an unchecked system fault that produces motor torque in the corresponding direction could develop, resulting in uncontrollable effects.

It is also possible to consider the behavior of the current safety function in the special functions that lower the manual torque.

The superimposition of torques is intended to make it easy for the driver to steer in the right direction. "Making it easy" in this case shall be understood to mean that the manual torque is reduced, which means that the EPS motor torque is increased.

In terms of safety, this process constitutes over-assistance, which is to say higher EPS motor torque with a lower manual torque. Meeting with only little resistance, the driver can thus steer in the direction of the steering stop and would be limited by the described plausibility check of the computed motor torque (motor torque limiter), which is to say the motor torque limiter would not allow these additional torques and limit the motor torque. However, these cases do not involve a fault that is to be prevented, but a functional property of the special function in question, which is to say the motor torque limiter must be developed so as to allow functionality of this type.

Some of the advantages of the invention include allowing a torque-based EPS special function to be performed without functional limitation, without necessitating deactivation of the safety function and modification of the accepted, approved parameters of the safety function. Possible effects of a fault are thereby mitigated. The procedure can be established as part of the safety validation.

The described method is particularly suitable for use in EPS systems comprising means for introducing added torque so as to achieve free steering torque influence, means for detecting the current manual torque, means for detecting electrical variables of the electric motor, and means for detecting the rotor position or rotor speed of the electric motor.

The described control is typically carried out by way of a control system, which is suitable for controlling a specified added torque. During the control process, the following method steps are typically carried out:

1. computing the target manual torque;
2. determining the actual manual torque;
3. minimizing the control deviation between the target torque and actual torque by computing a controlled target motor torque; and
4. controlling the current so as to establish the target motor torque.

The control process is thus carried out by way of a control system for generating added torques, wherein advantageously a microprocessor is provided, which communicates with an intelligent safety processor (watchdog). The 3-level design is typically employed to protect the computer core.

In at least some of the embodiments, the described method is based on the following requirements in regard to the EPS special functions: the superposed torques must either be limited to intrinsically safe numbers with respect to the value and gradient, or must be compliant by way of plausibility check measures with automotive safety integrity level D (ASIL D). Additionally, the superposed torques must only be requested in appropriate special situations and must be monitored and limited in terms of time. The superposed torques must also be subject to a plausibility check of the application direction and exclude undesirable, potentially oscillating changes in signs.

The described computer program comprises program code means for carrying out all the steps of a method, as described above, if the computer program is executed on a computer or a processor.

In addition, a computer program is described, comprising program code means for carrying out all the steps of a method described above if the computer program is executed on a computer or a corresponding processor.

The computer program product comprises these program code means, which are stored on a computer-readable data medium.

This computer program can be stored on a computer-readable data medium, such as a diskette, CD, DVD, hard drive, USB memory stick or the like, or on an Internet server as a computer program product. From there, the computer program can be transferred into a storage element of the control unit.

Further advantages and embodiments of the invention will be apparent from the description and the accompanying drawings.

The above characteristics and those explained below can, of course, be used not only in the described combination, but also in other combinations, or alone, without departing from the scope of the present invention.

The invention is schematically illustrated in the drawings based on an exemplary embodiment and will be described in detail hereafter with reference to the drawings.

DESCRIPTION OF THE PREFERRED EMBODIMENTS

Figure 1A:
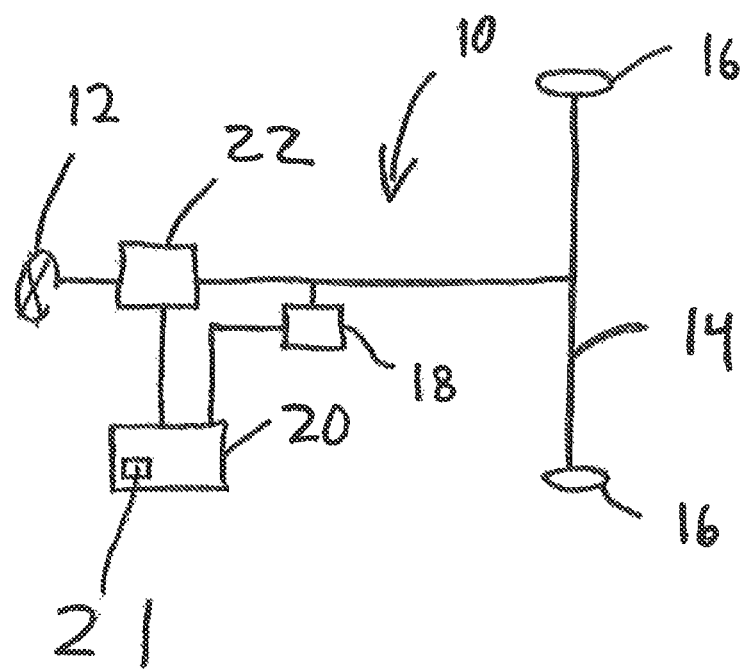
FIGS. 1a and 1b show an embodiment of the power steering system according to the invention.
Figure 1B:
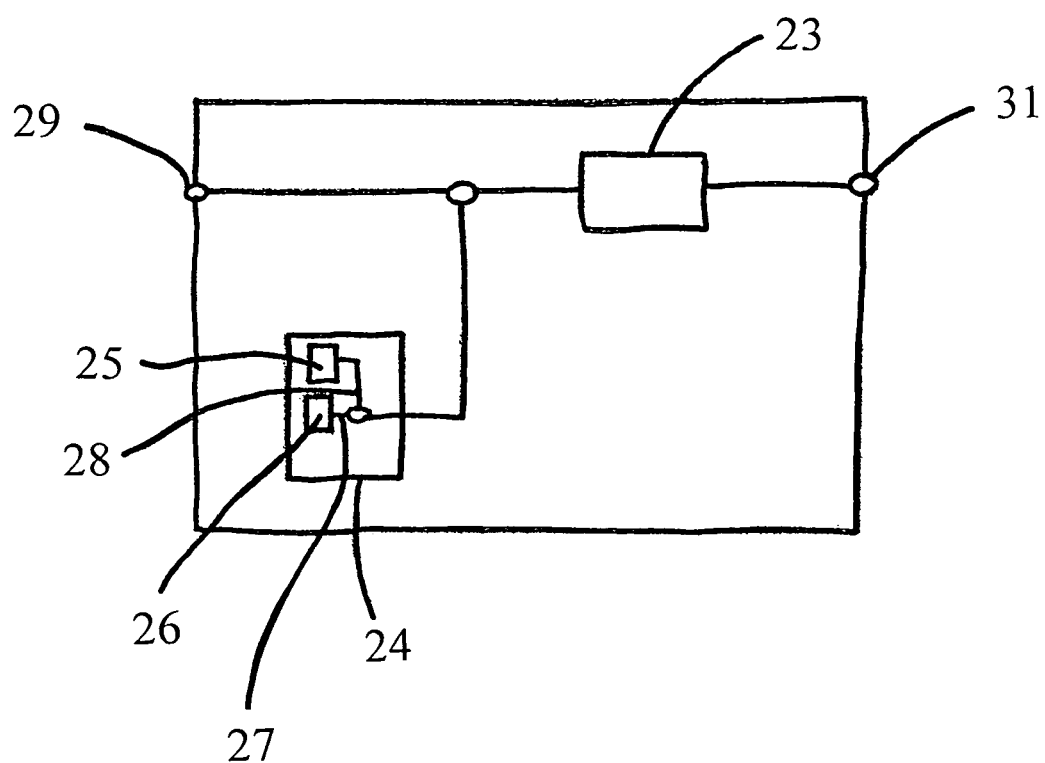

FIG. 1 shows, in sub-FIGS. 1a and 1b, an embodiment of the power steering system, which, in the overall, is denoted by reference numeral 10. FIG. 1a also shows a steering wheel 12, a front axle 14 comprising two linked wheels 16, an electric motor or EPS motor 18, a control unit 20 comprising an electronic processor 21, and a manual torque sensor 22. The control unit 20 comprising the processor 21 implements a motor actuation function for actuating the motor 18.

According to FIG. 1b, which describes software that is executed in the processor 21 of FIG. 1a, a feedback control unit 23 and a block 24 are provided, which specifies predetermined values for the feedback control unit 23. In this block 24, a driver assistance interface 25 and a region 26 for specifying steering sensation are provided.

The steering sensation is introduced into the system by way of the path $M_{steering\ sensation}$ (27), and the superposed torques are introduced by way of the path $M_{driver\ assistance}$ (arrow 28). The manual torque sensor signal is input by the manual torque sensor 22 in FIG. 1a at point 29. The motor torque for the motor 18 in FIG. 1a is specified at point 31.

The approach in this solution is based on the correction of the manual torque so as to compensate for the change caused by the added torque by way of the special function, and thus leaves the coordinated and approved parameters unchanged. A manual torque is thus computed, which would be required for the identical steering motion without a special function. This corrected signal is supplied to the safety function. As a result, no functional limitations occur in connection with the special functions.

Figure 2:
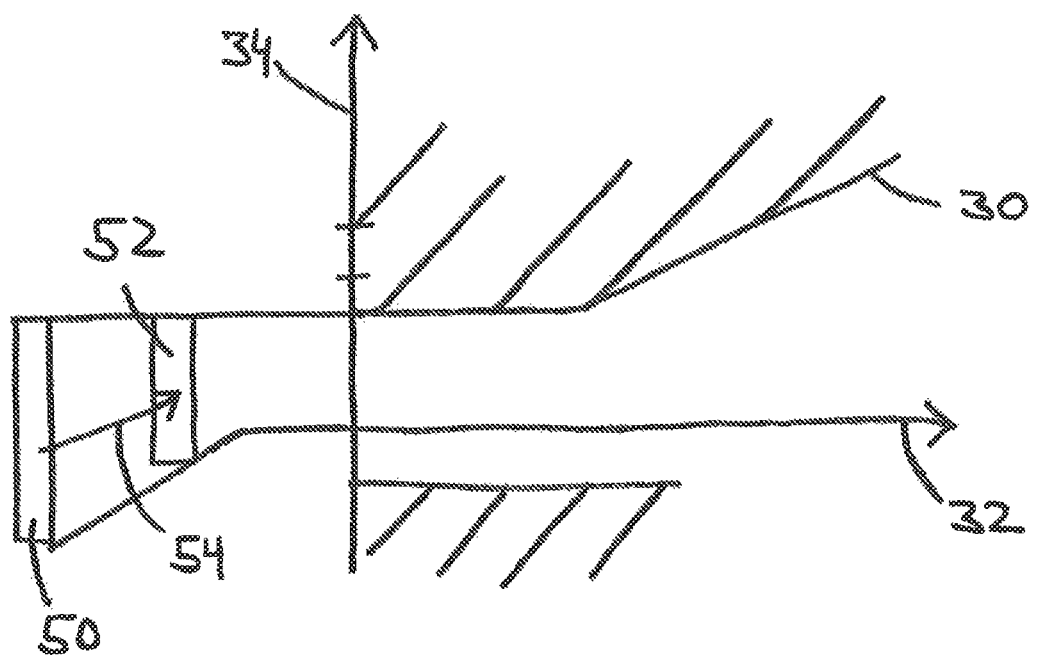
FIG. 2 shows a graph of the progression of the motor torque limit curve, illustrating the safety function for special functions that increase the manual torque.

FIG. 2 shows a graph of a progression 30 of the motor torque limit curve. The actual manual torque is plotted on the abscissa 32 and the motor torque is plotted on the ordinate 34. The illustration is intended to clarify the correction of the safety function for special functions that increase the manual torque.

In the example shown, for example, a right-hand curve is driven. An added torque of, for example, $M_{Offset}=-5$ Nm is applied by the action of a special function. The measured manual torque is thereby increased in terms of the value and is approximately $M_{Manual}=-8$ Nm. The contribution of the EPS motor decreases because the motor has to provide less assistance, which is to say no restrictions exist functionally. However, at 8 Nm manual torque, the safety function allows maximum motor torque (first range 50), although functionally this is not required and should be avoided from a safety perspective. A substitute manual torque $M_{Manual*}$ is calculated by way of the described correction:

$$M_{Manual*}=M_{Manual}-M_{Offset}=-8\ \text{Nm}-(-5\ \text{Nm})=-3\ \text{Nm}$$

The substitute manual torque corresponds to the manual torque that is required to travel the curve without the special function. The allowed motor torque is shifted from the first range 50 to a second range 52 (arrow 54), as a result of which the possible impact of faults is considerably less.

Figure 3:
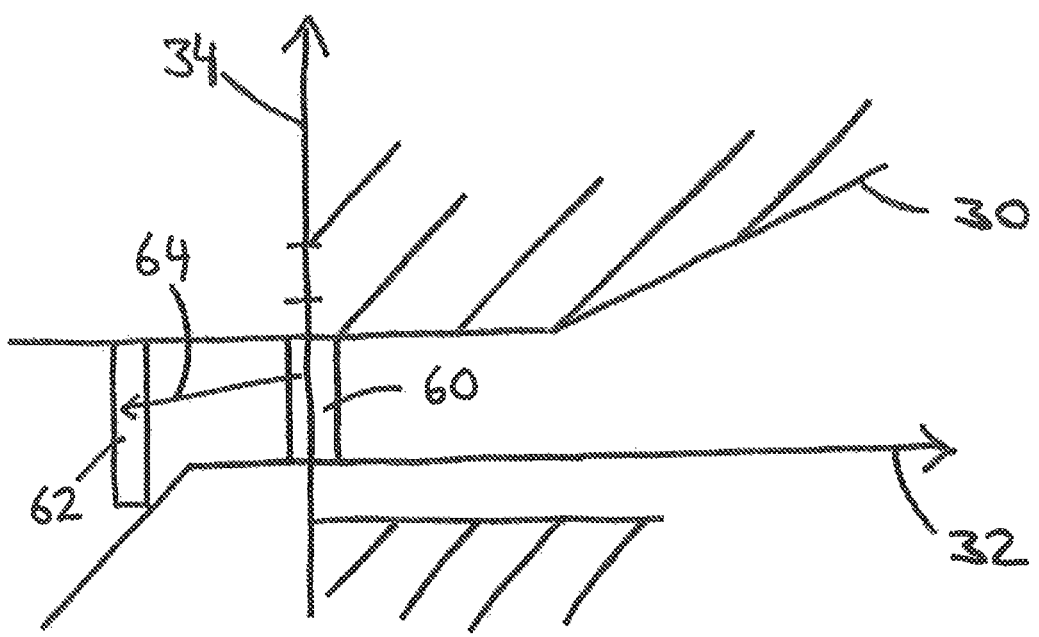
FIG. 3 shows a graph of the progression of the motor torque limit curve, illustrating the safety function for special functions that reduce the manual torque.

In FIG. 3, the motor torque limit curve 30 has been plotted in a manner corresponding to FIG. 2. The illustration is intended to clarify the correction of the safety function for special functions that reduce the manual torque.

Here, for example, a right-hand curve is driven, and an added torque of $M_{Offset}$=+5 Nm, for example, is applied by the action of a special function. The measured manual torque is thereby reduced in terms of the value and is approximately $M_{Manual}$=0 Nm. The contribution of the EPS motor increases because the motor has to provide greater assistance. However, due to the plausibility check measure, only low EPS motor torque is allowed at low manual torque, which is to say the request for the special function is possible only to a very limited extent and is limited (first range 60).

However, the curve cannot be traveled with a manual torque of approximately 0 Nm within the range of normal steering sensation coordination. Rather, higher manual torque is required for this purpose, without the special function. At higher manual torque, in turn, higher EPS motor torque is allowed. For this reason, it is functionally appropriate and necessary to correct the manual torque for the safety function, and a substitute manual torque $M_{Manual*}$ is computed as follows:

$$M_{Manual*}=M_{Manual}-M_{Offset}=0\text{ Nm}-(-5\text{ Nm})=-5\text{ Nm}$$

The substitute manual torque corresponds to the manual torque that is required to travel the curve without the special function. The allowed motor torque is shifted from the first range 60 to a second range 62 (arrow 64), and the request for torque for the special function is allowed.

This method can be established as part of a comparison of the vehicle response. The decisive factor for the vehicle response, which must be kept within the controllable range, is the toothed rack motion, because this steers the wheels. The motion is obtained from the sum of the manual torque and EPS servo torque. If the driver is required to provide a lower manual torque contribution due to special functions, die contribution of the servo-motor increases accordingly. However, the sum of manual torque and EPS motor torque on the toothed rack remains the same, which is to say only the amplification factor between the manual torque and the motor torque is altered by torque-based added functions. In this case, however, the appropriately signed sum of manual torque and added torque or motor torque is relevant for limiting the motor torque.

Consequently, from a safety perspective, in observing the vehicle behavior, there is no difference between a driver with special function and a corrected safety function, and an experienced driver who is able to control the situation within the limit range without the special function, and does so by drastically steering the steering wheel with a high manual torque, and thus high allowable motor torque.

The invention claimed is:

1. A method for operating a power steering system comprising an electronic processor for computing a motor torque, an electric motor for introducing the motor torque, and a device for detecting a measured manual torque, the method comprising:
computing the motor torque by the electronic processor as a function of the measured manual torque;
correcting said measured manual torque by either one of adding or subtracting a value of added torques of at least one special function to said measured manual torque to achieve a corrected manual torque that equals the measured manual torque plus or minus said value of added torques of said at least one special function;
substituting the corrected manual torque for the measured manual torque as an input to a plausibility check of the computed motor torque;
performing said plausibility check of the computed motor torque by the electronic processor based on said corrected manual torque; and
introducing the computed motor torque by the electric motor in dependence of a result of performing the plausibility check.

2. A method according to claim 1, wherein the measured manual torque, which is detected by way of a manual torque sensor, is controlled by specifying a target manual torque.

3. A method according to claim 1, which is carried out based on the following requirements:
the added torques must only be requested in appropriate special situations and must be monitored and limited in terms of time; and
the added torques must be subject to a plausibility check of application direction for said added torques and exclude undesirable, potentially oscillating changes in signs.

4. A control unit comprising an electronic processor and a computer program code means that configures the electronic processor to perform the following:
compute a motor torque as a function of the measured manual torque;
correct said measured manual torque by either one of adding or subtracting a value of added torques of at least one special function to said measured manual torque to achieve a corrected manual torque that equals the measured manual torque plus or minus said value of added torques of said at least one special function;
substitute the corrected manual torque for the measured manual torque as an input to a plausibility check of the computed motor torque;
perform said plausibility check of the computed motor torque by the electronic processor based on said corrected manual torque;
introduce the computed motor torque by the electric motor in dependence of a result of performing the plausibility check.

5. A control unit comprising said electronic processor and a computer-readable data medium that configures the electronic processor to perform the following:
compute a motor torque as a function of a measured manual torque;
correct said measured manual torque by either one of adding or subtracting a value of added torques of at least one special function to said measured manual torque to achieve a corrected manual torque that equals the measured manual torque plus or minus said value of added torques of said at least one special function;
substitute the corrected manual torque for the measured manual torque as an input to a plausibility check of the computed motor torque;
perform said plausibility check of the computed motor torque by the electronic processor based on said corrected manual torque; and
introduce the computed motor torque by the electric motor in dependence of a result of performing the plausibility check.

6. A method for operating a power steering system having a parameter-based steering safety function without deactivating the safety function and without modification of parameters of the safety function, the power steering system comprising an electronic processor for computing a motor torque, an electric motor for introducing the motor torque, and a device for detecting a measured manual torque, the method comprising:

computing the motor torque by the electronic processor that is established by suitable motor actuation of the electric motor, said computed motor torque being a function of the measured manual torque;

checking by the electronic processor, prior to said suitable motor actuation, for plausibility of the computed motor torque based on a corrected manual torque; and introducing the computed motor torque by the electric motor when said checking results in said computed motor torque being plausible so as to achieve a power steering system output torque that is a superposition of the computed motor torque to said measured manual torque; and introducing the computed motor torque by the electric motor in dependence of a result of performing the plausibility check; and wherein said corrected manual torque is the measured manual torque plus or minus a value of added torques of at least one special function;

wherein the electronic processor is configured to correct said measured manual torque by either one of adding or subtracting said value of added torques of said at least one special function to achieve said corrected manual torque as said measured torque plus or minus said value of added torques so as to avoid deactivating said parameter-based safety function when introducing said computed motor torque and so as to avoid a need to modify parameters of the parameter-based safety function in order for the parameter-based safety function to pass; and wherein the electronic processor is configured to check for plausibility of the computed motor torque by substituting the corrected manual torque for the measured manual torque as an input to said parameter-based safety function.

\* \* \* \* \*